(12) United States Patent
White et al.

(10) Patent No.: US 6,167,840 B1
(45) Date of Patent: Jan. 2, 2001

(54) FOOD DISH FOR PETS

(76) Inventors: Lehi White; Inez White, both of 2816 Sunset Plaza, Apt. A, Los Angeles, CA (US) 90005

( * ) Notice: Under 35 U.S.C. 154(b), the term of this patent shall be extended for 0 days.

(21) Appl. No.: 09/119,058

(22) Filed: Jul. 20, 1998

(51) Int. Cl.[7] ............... A01K 1/10; A01K 5/00; A01K 39/00
(52) U.S. Cl. ................. 119/61; 119/72
(58) Field of Search ............ 119/61, 72, 57.8, 119/57.9, 51.5

(56) References Cited

U.S. PATENT DOCUMENTS

| | | | |
|---|---|---|---|
| 2,715,386 | * 8/1955 | Jones | 119/51.5 |
| 2,887,988 | * 10/1959 | Cottongim | 119/51.5 |
| 2,937,617 | * 5/1960 | Brody et al. | 119/51.5 |
| 4,953,506 | * 9/1990 | Sanders | 119/61 |
| 4,966,099 | * 10/1990 | Arney | 119/61 |
| 5,165,365 | * 11/1992 | Thompson | 119/61 |
| 5,205,242 | * 4/1993 | Kasselman | 119/61 |
| 5,253,609 | * 10/1993 | Partelow et al. | 119/61 |

\* cited by examiner

*Primary Examiner*—Peter M. Poon
*Assistant Examiner*—Judith A. Nelson
(74) *Attorney, Agent, or Firm*—Julius Rubinstein

(57) ABSTRACT

This food dish for pets is to prevent vermin or insects from reaching the food in a pet food dish, because many pets refuse to eat food, which is infested with insects or vermin. This dish is formed so it contains water and pet food. To prevent insects or vermin from reaching the food, the food dish is formed with barriers in the forms of a small cup, which may contain detergent or other chemicals poisonous to insects. These barriers are positioned so they require the insects or vermin have to swim over the detergent or other poison to reach the food. This has the effect of killing the insect before it can infest the food.

1 Claim, 1 Drawing Sheet

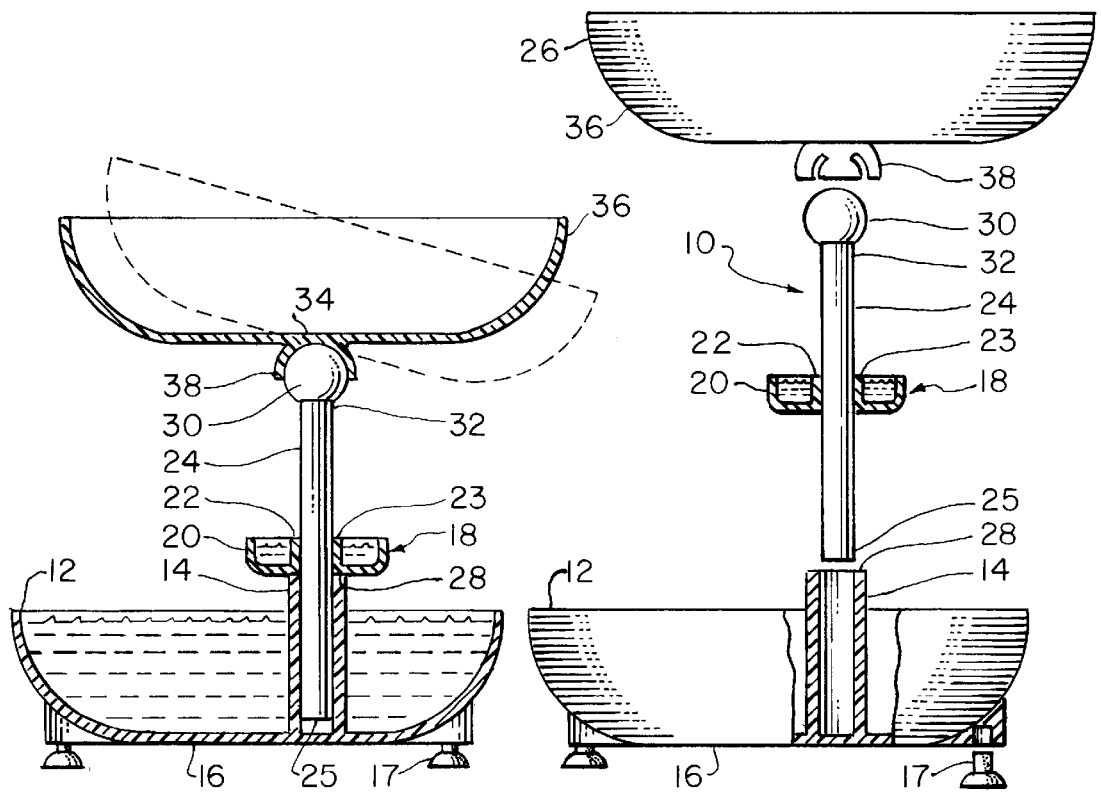
FIG. 2.   FIG. 1.
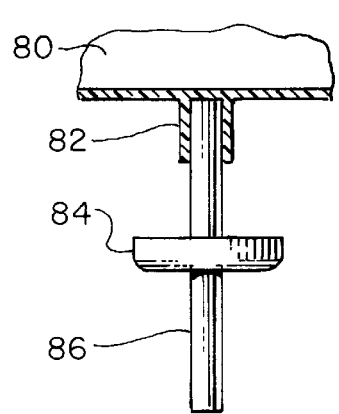
FIG. 5.
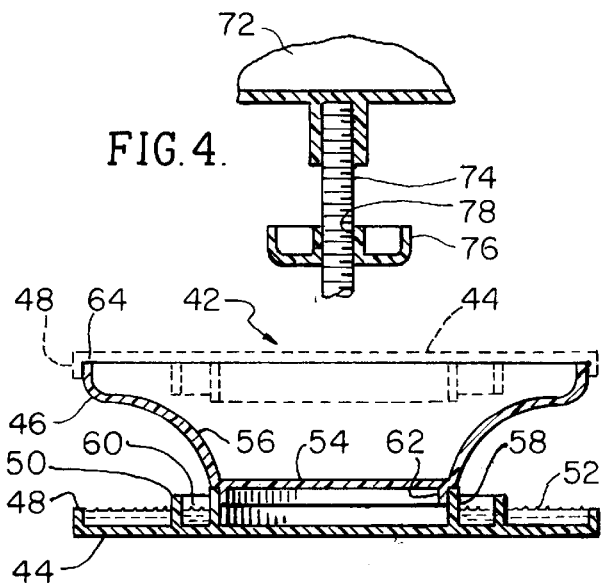
FIG. 4.
FIG. 3.

FOOD DISH FOR PETS

This invention relates to an animal-feeding dish for protecting food in the dish from infestation by ants, roaches, and other vermin.

FEDERALLY SPONSORED RESEARCH

No part of this patent application was developed with the aid of any federally sponsored research and development.

BACKGROUND AND RELATED ART

Many animals, such as cats will not eat food from a food dish, which is infested with ants or other vermin or has the odor of rodents. In the past, efforts have been made to solve this problem by providing one or more moats filled with water which surround the food dish because many insects are unable to enter the water to reach the food. Examples of such food dishes are shown in the reference cited separately. In general, these references disclose a number of moats filled with water or a liquid such as moats designed to prevent insects from reaching the food. However some insects can swim in water and cause problems. These problems can be prevented by filling a moat with a liquid such as a household cleaning fluid, instead of water which is fatal to insects and which is positioned so an insect has to enter the fluid to reach the food. However there is a danger that the pet may drink the liquid and get sick.

To prevent this an important object of this invention is to provide a pet food dish, which has means for preventing vermin from reaching the food.

Another object of this invention is to provide a combined pet food dish and water source which includes a container filled with a liquid poisonous to insects and which is positioned so insects have to enter the liquid to reach the food and positioned so that the pets can't reach the liquid in the container These and other objects of this invention will become more apparent when better understood in the light of the accompanying drawings and specification.

Wherein FIG. 1 is an exploded view showing all the parts of one embodiment of the novel pet feeding dish.

FIG. 2 is a cross sectional elevational view of the dish shown in FIG. 1 when assembled.

FIG. 3 is an alternate configuration of a pet feeding dish which has a base heavy enough to give the dish a low center of gravity to prevent the pet from tipping the dish over and which also serves as a cover for the food bowl when not in use.

FIG. 4 is another embodiment of a pet feeding dish which has an insect trough which can be adjustably positioned for preventing a pet from reaching a poisonous liquid in the insect trough that is secured to the feeding bowl.

FIG. 5 is a modification of the embodiment shown in FIG. 1 wherein a downwardly extending tube is secured to the bottom of the food dish for receiving the upper end of a support rod so that the bowl can be lifted off the rod for easy cleaning.

DETAILED DESCRIPTION

Referring now to FIG. 1 of the drawing the pet feeding dish 10 constructed according to the principles of this invention comprises a water holding bowl shaped base 12 and a food bowl 26. The base when filled with water lowers the center of gravity of the food dish thereby preventing a pet from tipping it over when feeding. The water-holding base is provided with a tubular support 14 extending upwardly from the bottom portion 16 of base 12. If desired, suction cups 17 that can stick to a surface may be secured to the bottom portion 16 of the base 12 to prevent the pet from moving the feeding dish from around when it feeds.

A bowl holding support rod 24 having a bottom portion 25 extends down through the tubular stem support 14 and is supported thereby. A combined barrier and insect repellant trough 18 may be vertically and adjustably mounted on support rod 24. This trough comprises outer and inner upstanding cylindrical walls 20 and 22 defining a liquid holding container. The cylindrical inner walls 22 of the trough 18 define an opening 23 so the lower end 25 of the support rod 24 can extend through the opening see FIGS. 1 and 2.

In the embodiment shown in FIG. 1 a swivel ball receiving formation 38 is secured to the bottom of the food bowl 26 and extends downward from the center 34, see FIG. 2. The upper end 30 of the support rod is spherical and is sized to enter ball receiving portion 38 the so the food bowl 26 can be pivoted on support rod 24 and be easily removed from the support rod for cleaning.

In the embodiment shown in FIG. 2, the trough 18 is moved down the support rod 24 until it rests on the upper end 28 of the tubular support rod 14, see FIG. 2. Although other positions on the support rod are contemplated.

With this arrangement a small amount of liquid poisonous to vermin, such as a household detergent, fills the trough 18. The trough 18 is positioned close enough to the bottom 34 of the food bowl to prevent the pet from reaching and drinking the poisonous liquid, see FIG. 5.

As shown in FIG. 2, the poisonous liquid such as a household detergent in the trough 18 is isolated from the water in the bowl 12, so that the small amount of household detergent in the trough cannot easily drop into the bowl 12. If, by chance, some does, the amount held in the trough is too small to cause serious injury to the pet.

It is noted in FIGS. 1 and 2 that the tubular stem 14 is offset from the center of the bowl 12 in an amount sufficient to permit the pet to have access to the water that is contained in the bowl. The usefulness of the adjustment of the insect trough is seen by comparing FIGS. 2, and 4. Depending on the size of the pet, the insect trough shown in FIG. 2 is closer to the water in the bowl. In contrast the insect troughs shown in FIGS. 1 and 4 are further away from the water filled bowl, to provide better access to larger pets. At the same time ants or other insects that manage to reach the tubular stem 14 will be prevented from reaching the food in the upper bowl 26 by the poisonous liquid in trough 18.

A modified form of an animal feeding dish 42 is shown in FIG. 3 of the drawing. This dish comprises a base part 44 and a food bowl 46. The base part is a generally flat plate heavy enough so the food dish 42 has a low center of gravity to prevent the pet from tipping it over. A cylindrical upstanding flange 48 is formed on the periphery of the base part 44. The flange 48 has two functions. One function as described in connection with the first embodiment is to hold drinking water on the base part 44. The other function is to permit the base to be used as a cover for the bowl 46 to avoid attracting ants or other insects when the pet feeding dish is stored away, see FIG. 3.

A second upstanding flange 50 integral with the base part 44 is concentric with and radially inwardly spaced from flange 48. This defines a space 52 providing access to the water for the pet. The bottom 54 of the food bowl 46 leads into concave upwardly extending sides 56 shaped to provided better access for the pet to get access to the water in the trough 52 and to make it more difficult for vermin to crawl up the concave sides 56.

A third upwardly extending flange 58 is concentric with and radially inwardly spaced from flange 50. This flange is higher than flanges 48 and 50 and has a plurality of functions. First it defines a separate small liquid trough 60 for holding a fluid, such as a dish washing liquid which is poisonous to insects. Trough 60 is separate from trough 52 and flange 58 is sized so it is close to the bottom 54 of the modified food dish 46 so that the pet has no access to the liquid in trough 60.

The base 54 of the food dish has a concentric downwardly extending flange 62 which holds the food bowl 46 in a stable position when the resting on a surface.

The diameter of the flange 48 is sized so when the base 44 rests on the rim 64 of the modified food bowl 46 as shown in FIG. 3, flange 48 abuts the facing surfaces of rim 64. This permits the base 44 to be used as a food cover and prevents flying insects from getting inside the food bowl.

The food dishes shown in FIGS. 1 and 2 may not be suitable for larger animals which when drinking water may tip the dish over. To prevent this from happening the food dish 70 shown in FIG. 4 is separate from the water, which may be placed in a nearby pail or bowl. The food dish comprises a heavy flat base (not shown) and a food bowl 74 to provide the food dish with a low center of gravity. A vertically upwardly extending threaded support rod 74 is secured by any suitable means to the center of the base. An insect trough 78 has a threaded opening 79 so it can be threaded onto support rod 74 and adjusted so it will be close enough to the bottom of the food bowl to prevent the pet from reaching the poisonous fluid in the trough. Although the support rod 76 and trough 78 are in threaded engagement, other means well known in the art are contemplated for adjusting the position of the trough 78 on the support rod so that the pet has no access to the poisonous liquid in the insect trough.

The embodiment 80 shown in FIGS. 2 is similar to the embodiment shown in FIG. 1 except that the base 34 of the food bowl 80 has a downwardly extending tube 82 sized to receive the upper end of the support rod 84 to support the food bowl 80. The insect trough 86 is adjustably mounted on the support rod. This arrangement makes it easy to remove the food bowl from the support rod because it can be simply lifted up off the support rod and cleaned.

Having described the invention what I claim as new is:

1. A combined pet feeding and watering dish comprising:

a food holding bowl and a bowl shaped water holding base; the periphery of the said water holding base sized to fit over the periphery of the food holding bowl, as a cover, to prevent the entry of vermin when the food holding bowl is not in use; an upwardly projecting support rod, said support rod having an upper end portion and a lower end portion, said lower end of the support rod secured to said base, said upper end of the support rod secured to said food holding bowl; an insect trough situated between the food holding bowl and said water holding base, and said trough adapted to hold a liquid poisonous to insects, said insect trough having a center support rod receiving opening, said support rod extends through said opening and is sized and positioned to prevent a pet from having access to the trough, said insect trough mounted for vertical adjustment on said support rod and in such a way that insects cannot crawl up the support rod past the trough to infest the food in the food holding bowl.

* * * * *